US 7,054,648 B2

(12) United States Patent
Abtin et al.

(10) Patent No.: US 7,054,648 B2
(45) Date of Patent: May 30, 2006

(54) LOCATION PRIVACY PROXY SERVER AND METHOD IN A TELECOMMUNICATION NETWORK

(75) Inventors: Afshin Abtin, Karlstad (SE); Olof Jansson, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 745 days.

(21) Appl. No.: 10/038,233

(22) Filed: Oct. 22, 2001

(65) Prior Publication Data

US 2003/0078053 A1   Apr. 24, 2003

(51) Int. Cl.
*H04Q 7/20* (2006.01)
(52) U.S. Cl. ............... 455/456.2; 455/456.3; 455/456.6; 455/414.1; 709/229; 709/227
(58) Field of Classification Search ............ 455/456.2, 455/456.3, 456.6, 411, 410, 414.1, 414.2, 455/415; 709/229, 219, 227
See application file for complete search history.

(56) References Cited

U.S. PATENT DOCUMENTS

| 5,771,280 | A | 6/1998 | Johnson ............... 379/93.23 |
| 6,594,483 | B1* | 7/2003 | Nykanen et al. ........... 455/411 |
| 6,609,106 | B1* | 8/2003 | Robertson ................ 705/26 |
| 6,662,014 | B1* | 12/2003 | Walsh .................. 455/456.2 |
| 2002/0016831 | A1* | 2/2002 | Peled et al. ............. 709/219 |
| 2002/0160766 | A1* | 10/2002 | Portman et al. .......... 455/422 |
| 2002/0173318 | A1* | 11/2002 | Dyer ..................... 455/456 |
| 2003/0064723 | A1* | 4/2003 | Thakker ................. 455/456 |
| 2003/0074456 | A1* | 4/2003 | Yeung et al. ............ 709/229 |
| 2003/0181205 | A1* | 9/2003 | Yiu et al. ............... 455/426.1 |

FOREIGN PATENT DOCUMENTS

| EP | 108024 | 7/2002 |
| GB | 2 353 919 A | 7/2001 |

* cited by examiner

*Primary Examiner*—Danh Cong Le

(57) ABSTRACT

A method and apparatus for controlling positioning of a user and the user's privacy related information on the mobile Internet includes a location privacy proxy which upon receipt of a request to position a user determines whether a location based service is allowed to position the user. The user retains the right to manually override the rejection of a location based service requesting to position the user.

20 Claims, 5 Drawing Sheets

LOCATION PRIVACY PROXY SERVER AND METHOD IN A TELECOMMUNICATION NETWORK

TECHNICAL FIELD

The present invention relates to mobile positioning on the mobile Internet, and more particularly, to protecting the privacy of mobile devices communicating with the mobile Internet.

BACKGROUND OF THE INVENTION

The mobile Internet, and especially location based services (LBS) are evolving applications relating to the use of the Internet. Additional terminal capabilities and the 3G service network are beginning to reach the market. The development of these services places at issue the privacy of end users and devices utilizing these services.

As the use of the mobile Internet expands, the resolution of security and privacy issues will become increasingly important. End users will desire to maintain the privacy and security of various types of data associated with devices with which they access the mobile Internet including things such as the MSISDN (phone number), location data associated with the mobile device, time and time related data, services accessed by an end user, and user IDs and passwords. Along with these expanded desires of end users to protect certain types of user information has come the development of laws relating to the mobile Internet and particularly location information associated with users. Countries are beginning to propose regulations on how the location of end users may be processed and provided to third parties.

While present mobile location applications are usually based upon a user initiated location request provided directly and only to the user, future applications such as network initiated positioning or triggers causing the position of an end user to be tracked, raise increased privacy aspects with respect to the party requesting positioning information. Thus, some manner for providing user control of location data and other types of privacy information would be greatly beneficial in the developing uses of the mobile Internet.

SUMMARY OF THE INVENTION

The present invention overcomes the foregoing and other problems with a system and method wherein upon receipt of a request to position a user using location based services (LBS), a location privacy proxy (LPP) is accessed to determine whether or not the LBS is allowed to position the user. Responsive to this determination, the user may then, or may not, be positioned.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
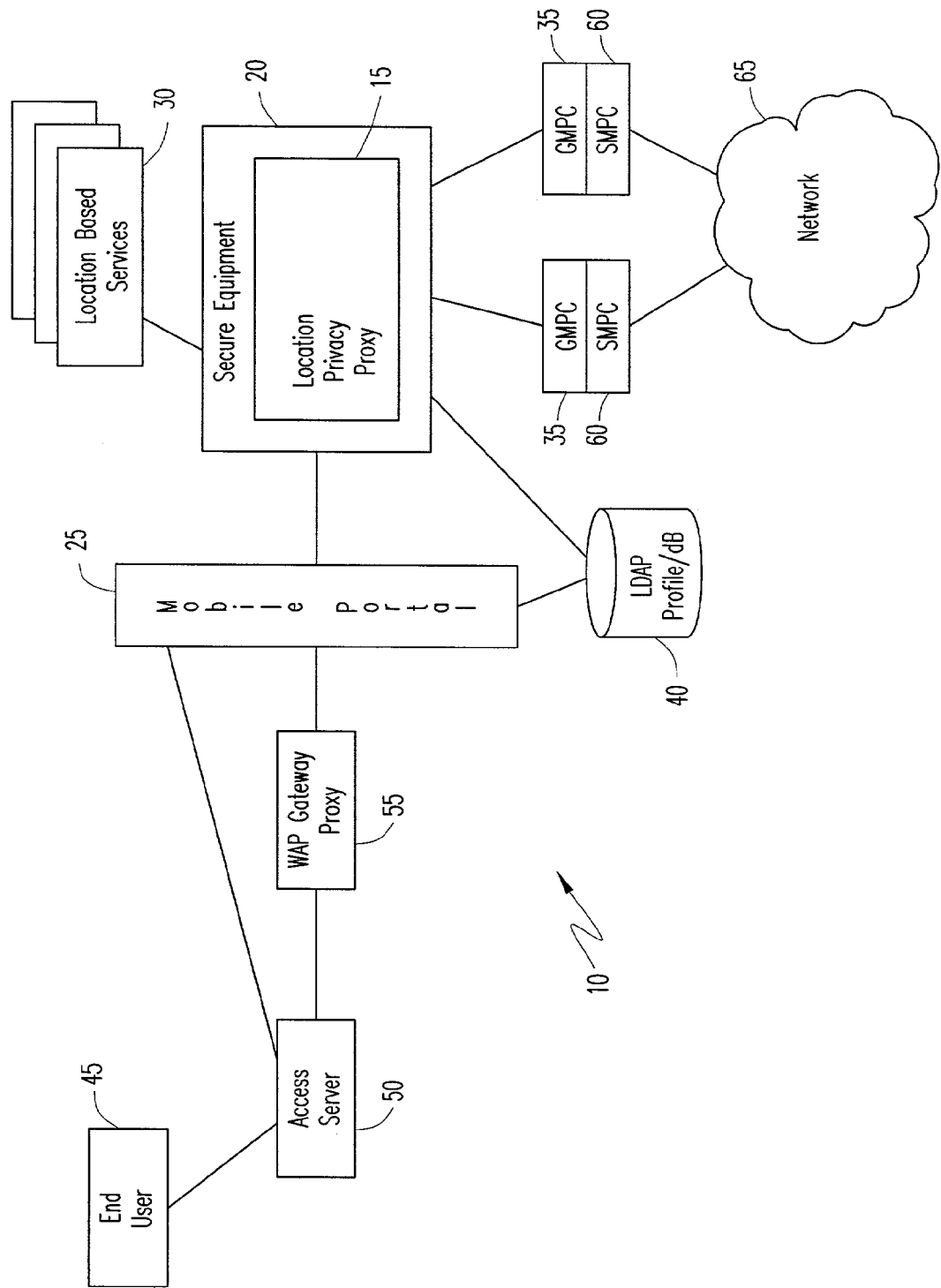
FIG. 1 is a block diagram of an environment of operation of the location privacy proxy of the present invention.

Referring now to the drawings, and more particularly to FIG. 1, there is illustrated a network 10 incorporating the location privacy proxy 15 of the present invention. The end user 45 comprises a user utilizing a mobile communication device such as mobile telephone, personal data assistant, pager, laptop computer or other type of mobile device which may wirelessly access the mobile Internet. The access server 50 provides access to a PLMN (not shown) using the WAP protocol by end user 45. The WAP gateway proxy 55 acts as an interconnect between the PLMN and an external network (i.e., the Internet 65) utilizing a protocol other than the WAP protocol such as an IP protocol. The mobile portal 25 provides an access point for the end user 45 to select particular services to be provided or not provided to the end user 45. The location privacy proxy 15 is located within secure equipment 20 having interfaces with the mobile portal 25, location based services (LBS) 30, gateway mobile positioning centers (GMPC) 35 and LDAP (Lightweight Directory Access Protocol) profile database 40. The LDAP profile databases 40 comprise server nodes serving as catalogues and/or subscriber databases and are normally controlled by an operator. The LPP 15 is a centralized privacy control function separated from the positioning systems. The LPP 15 uses end user profiles stored within the LDAP profile database 40 or responses received from an end user 45 through the access server 50, WAP gateway proxy 55 and the mobile portal 25 to determine if the user may be positioned. The LPP 15 provides a standardized interface between the LBS 30 and the positioning systems. The LPP 15 enables a user to manually override these privacy settings whenever there is a conflict between the privacy policy of the user and the privacy policy of the LBS 30. This allows positioning in special cases where privacy levels do not agree. The overrides must be confirmed by the user using SMS. The positioning systems include the gateway mobile positioning centers 35 and the serving mobile positioning centers (SMPC) 60.

The positioning information for an end user 45 is obtained from a PLMN network 65 through the GMPCs 35 and the SMPCs 60. User profiles associated with an end user 45 are stored within the LDAP profile database 40. The user profiles stored within the LDAP profile database 40 contain information describing the applications which may position the end user 45. This may be done by user established privacy preferences. One example of privacy preferences includes ranking applications with privacy level one, privacy level two or privacy level three. Privacy level one is associated with trusted applications which are normally located within a system operator's domain and does not require accessing an external network such as the Internet. Privacy level two applications are semi-trusted applications which are offered by partners of the system operator. Finally, privacy level three applications are untrusted applications which are from unknown parties to which no particular trust level may necessarily be imparted. Additional privacy level definitions may include, but are not limited to, no positioning wherein the end users will not allow themselves to be positioned at all, and a black listing wherein end users may define specific applications to not be able to position a user despite the established privacy level of the end user and the application. The privacy level of an application is set by the network operator based on similar criteria, and stored in the LDAP profile database 40 as one of the services available to end users 45.

Figure 2:
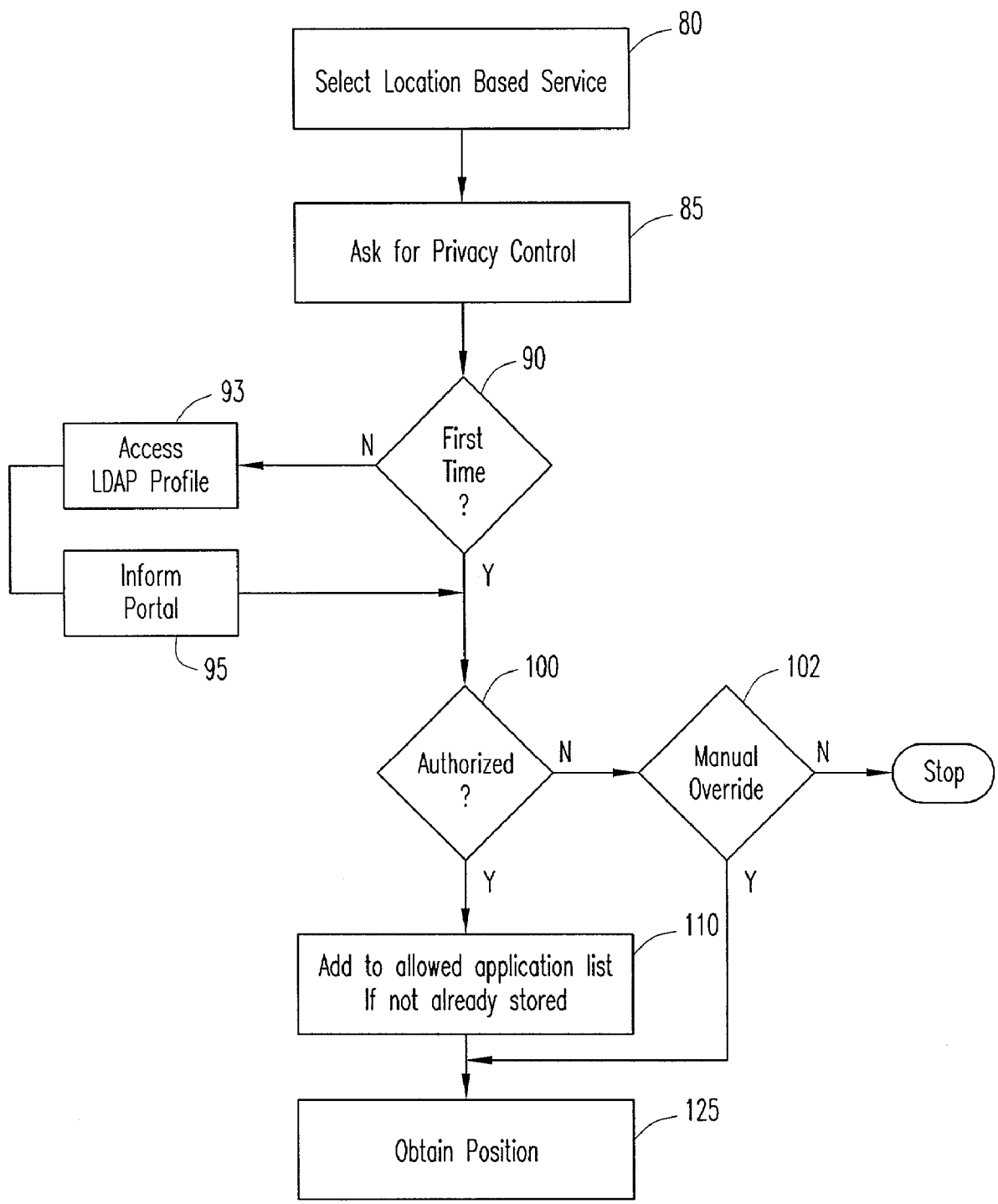
FIG. 2 is a flow diagram illustrating the operation of the location privacy proxy.

Referring now to FIG. 2, there is a flow diagram illustrating a use case of the LPP 15 of the present invention. The mobile portal 25 offers a number of LBS 30 which may be selected by either the end user 45 or a third party interacting with the mobile portal 25 via a network 65, such as the Internet. One of the LBS is selected at step 80 and the portal 25 asks the location privacy proxy 15 at step 85 for privacy control of the requested location based service. The LPP 15 determines at inquiry step 90 whether this is the first time the user is requesting this particular LBS 30. If so, the LPP 15 determines at inquiry step 100 whether the end user 45 has authorized use of the LBS 30 by accessing the user profile within the LDAP profile data base 40 or asking the end user 45 directly through the mobile portal 25. If the use of the LBS 30 is authorized, the application is added to the user's list of allowed applications within the LDAP profile database 40 at step 110. If the service 30 is not authorized, inquiry step 102 determines if the user manually overrides to enable positioning. If inquiry step 90 determines that this is not the first time for the end user 45 to access the location based service 30, the LPP 15 will assess the LDAP profile database at step 93, inform the portal at step 95 of the user's privacy preferences for the request, and determine whether the location based service is authorized at step 100.

If the LBS 30 is authorized to position the end user 45, the LPP 15 will obtain the position of the end user from the GMPC 35 and attach this information to the position request at step 125. It is up to the operator to define whether the MSISDN of the end user is sent to the LBS 30 based upon whether the application is a trusted or untrusted entity.

Figure 3:
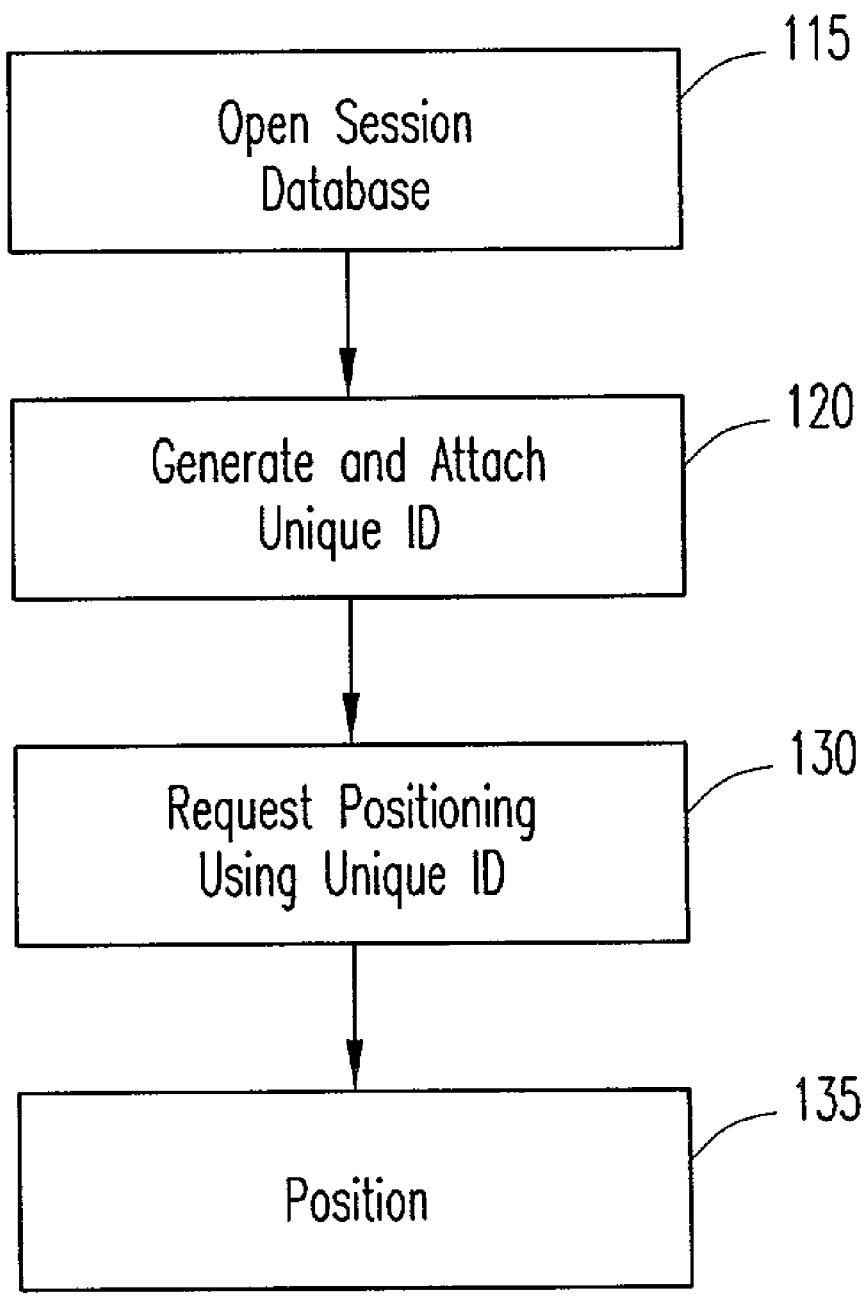
FIG. 3 is a flow diagram illustrating positioning with an untrusted application.

Referring now to FIG. 3, if the LBS 30 is not a trusted application, the LPP 15 may be configured to act as a broker between the untrusted application and the GMPC 35. The GMPC 35 (Gateway Mobile Positioning Center) is a proprietary term for GMLC (Gateway Mobile Location Center) which is in the GSM standard. The GMPC 35 collects the position coordinates for a device connected to a certain MSISDN. The LPP 15 opens a session database at 115 responsive to the incoming request from the portal 25. The LPP 15 generates and attaches at step 120 a unique ID for the request before transmitting this information to the LBS 30. The unique ID will be mapped internally to the MSISDN of the end user 45 making a request by the LPP 15. The LPP will not keep the MSISDN and the position data together. This means that internal privacy issues will be secured by not relating the MSISDN with the end user 45 position information. The LBS 30 will ask the LPP 15 for the positioning request at step 130 and the LPP 15 will communicate at step 135 the positioning request to the GMPC 35.

The end user 45 may also ask the portal 25 to always use the LPP 15 with any location related request. The LPP 15 will also offer an interface toward an SMS-C gateway (not shown) which will enable untrusted applications to send out SMS messages. These applications will not have access to the MSISDN numbers, only a unique ID generated by the LPP 15. Additionally, the LPP 15 may offer other interfaces such as multimedia messaging server (MMS) to enable untrusted applications to communicate with the end users through the LPP.

Figure 4:
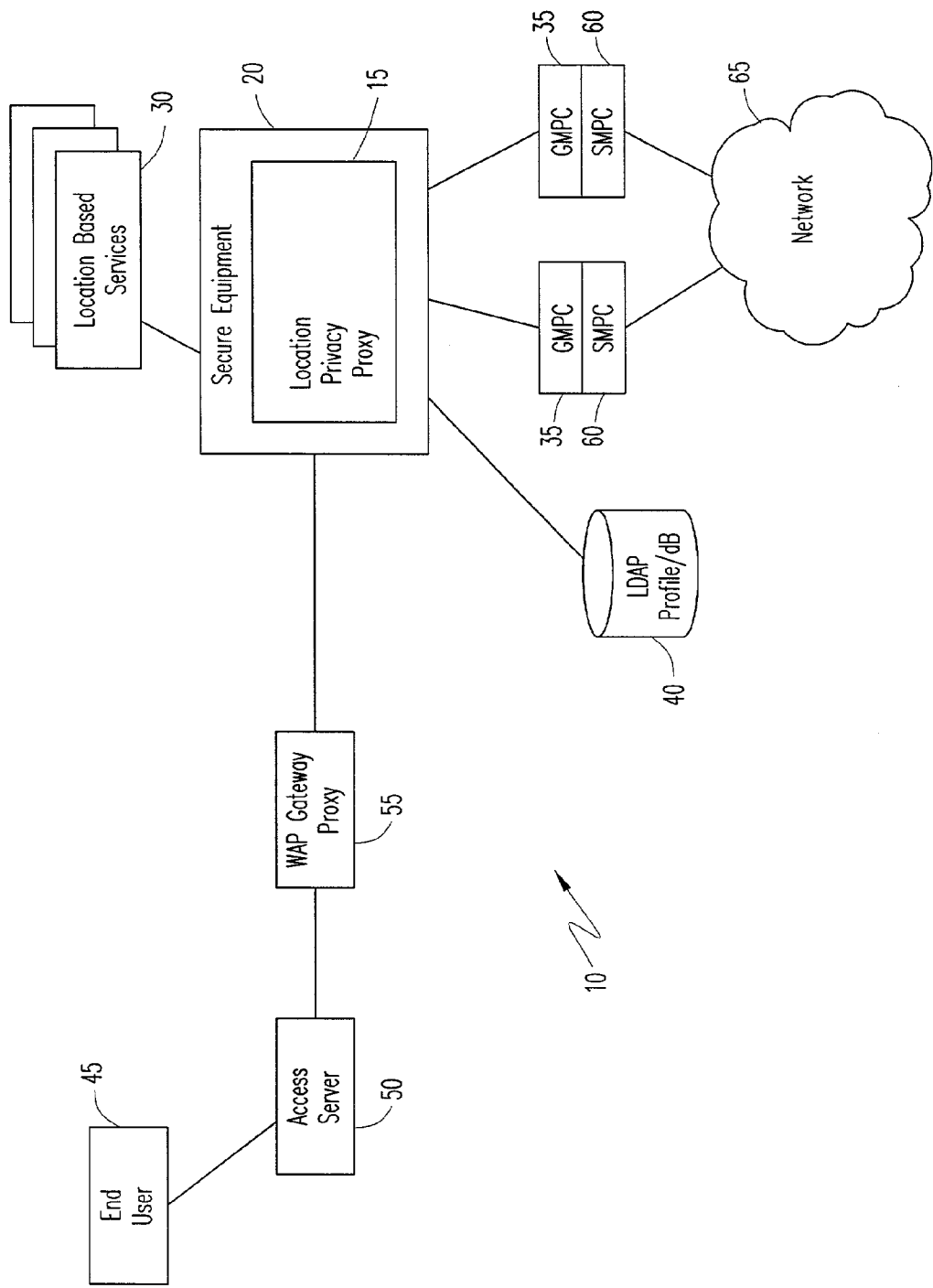
FIG. 4 is a block diagram of an alternative environment of operation of the location privacy proxy of the present invention.

Referring now to FIG. 4, there is illustrated an alternative embodiment wherein the location privacy proxy 15 is connected directly to a WAP gateway 55 without utilizing a portal connection as described in FIG. 1. Other than the location privacy proxy 15 being directly connected to a WAP gateway 55, the configuration of the system 10 described in FIG. 3 is identical.

Figure 5:
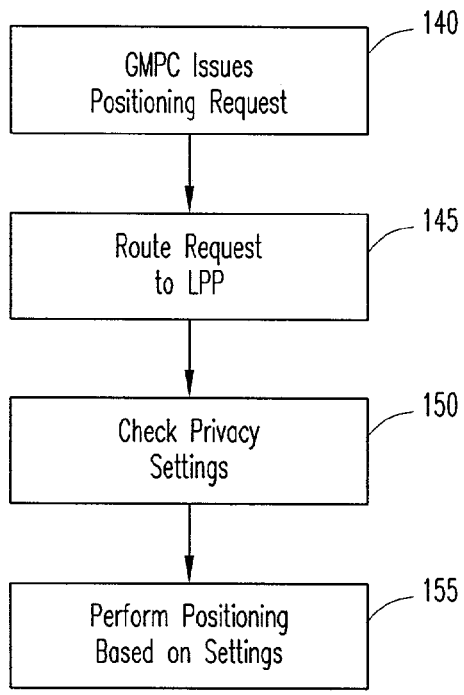
FIG. 5 illustrates a first positioning scenario in the system of FIG. 4.

Referring now also to FIG. 5, there is illustrated a first scenario of operations via the system 10 described in FIG. 4 wherein the GMPC 35 issues a positioning request at step 140. The request is routed at step 145 to the location privacy proxy 15. The request at the GMPC 35 may be initiated by an end user 45 directly accessing the GMPC 35 or by, for example, a fleet management application or a friend finder application trying to position a user. In either case, a GMPC 35 has access to the MSISDN of the user which is to be positioned. The GMPC 35 request is routed via the location privacy proxy 15 to achieve a higher privacy control, and enable a check of the privacy settings at step 150 by accessing the LDAP profile/database 40 and checking the privacy settings associated with the MSISDN. Based upon the settings a positioning may either be performed or denied at step 155.

Figure 6:
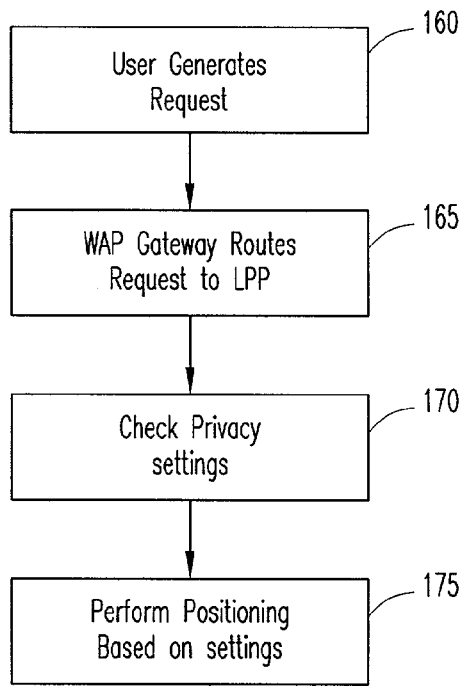
FIG. 6 illustrates a second positioning scenario in the system of FIG. 4.

In an additional scenario illustrated in FIG. 6, a user 45 generates a request at step 160, and the request is routed by the WAP gateway 55 to the location privacy proxy 15 at step 165. The LPP will check the user's privacy setting at step 170 by accessing the LDAP 40 and positioning is performed based upon the settings at step 175.

The previous description is of a preferred embodiment for implementing the invention, and the scope of the invention should not necessarily be limited by this description. The scope of the present invention is instead defined by the following claims.

What is claimed is:

1. A method for positioning of a user on the mobile Internet, comprising the steps of:
   receiving a request to position the user using a location based service;
   accessing a location privacy proxy to determine if the location based service may position the user, further comprising the steps of:
   determining if the location based service has previously positioned the user:
   if the location base service has not previously positioned the user, determining if the user manually authorizes positioning by the location based service: and
   storing an indication of whether the location based service is authorized to position the user;
   generating a unique ID within the location privacy proxy for a request from an untrusted application;
   associating the unique ID with the MSISDN of the user being positioned; and
   positioning the user based on the determination made by the location privacy proxy.

2. The method of claim 1, wherein the request is received from a mobile portal.

3. The method of claim 1, wherein the request is received from a WAP gateway.

4. The method of claim 1, wherein the request is received from a positioning server.

5. The method of claim 1, wherein the step of accessing further comprises the steps of:
   determining if the location based service has previously positioned the user;

if the location based service has previously positioned the user, accessing a user profile to determine if the user may be positioned if the user manually authorizes the positioning.

6. The method of claim 1, wherein the step of positioning further comprises the steps of attaching the unique ID of the user to a positioning request prior to positioning the user.

7. A method for controlling positioning of a user on the mobile Internet, comprising the steps of:
   receiving a request to position the user using a location based service;
   determining if the location based service has previously positioned the user using a location privacy proxy;
   if the location based service has previously positioned the user, accessing a user profile to determine if the user may be positioned;
   if the location based service has not previously positioned the user, determining if the user manually authorizes positioning by the location based service;
   storing an indication of whether the location based service is authorized to position the user;
   generating a unique ID within the location privacy proxy for a request from an untrusted application;
   associating the unique ID with the MSISDN of the user making the request; and
   positioning the user based on the determination made by at least one of the location privacy proxy or manual authorization by the user.

8. The method of claim 7, wherein the request is received from a mobile portal.

9. The method of claim 7, wherein the request is received from a WAP gateway.

10. The method of claim 7, wherein the request is received from a positioning server.

11. The method of claim 7, wherein the step of positioning further comprises the steps of:
    attaching the unique ID of the user to a positioning request prior to positioning the user.

12. A method for controlling positioning of a user on the mobile Internet, comprising the steps of:
    receiving a request to position the user using a location based service;
    accessing a location privacy proxy to determine if the location based service may position the user, further comprising the steps of:
    determining if the location based service has previously positioned the user;
    if the location based service has not previously positioned the user, determining if the user manually authorizes positioning by the location based service; and
    storing an indication of whether the location based service is authorized to position the user;
    generating a unique ID within the location privacy proxy for a request from an untrusted application;
    associating the unique ID with the MSISDN of the user making the request;
    attaching the unique ID of the user to a positioning request prior to positioning the user; and
    positioning the user based on the determination made by the location privacy proxy.

13. The method of claim 12, wherein the request is received from a mobile portal.

14. The method of claim 12, wherein the request is received from a WAP gateway.

15. The method of claim 12, wherein the request is received from a positioning server.

16. The method of claim 12, wherein the step of accessing further comprises the steps of:
    determining if the location based service has previously positioned the user;
    if the location based service has not previously positioned the user, accessing a user profile to determine if the user may be positioned.

17. A location privacy proxy, comprising:
    a first interface for receiving positioning requests for a user;
    a second interface for accessing location based services;
    a third interface for accessing a positioning server; and
    control logic configured to:
      receive a request to position the user using a location based service;
      determine if the application may position the user, further configured to:
        determine if the location based service has previously positioned the user;
        if the location based service has not previously positioned the user, determine if the user authorizes positioning by the location based service; and
        store an indication of whether the location based service is authorized to position the user;
      generate a unique ID within the location privacy proxy for a request from an untrusted application;
      associate the unique ID with the MSISDN of the user making the request; and
      position the user based on the determination made by the location privacy proxy using the positioning server.

18. The location privacy proxy of claim 17, wherein the control logic is further configured to:
    determine if the location based service has previously positioned the user;
    if the location based service has not previously positioned the user, determine if the user authorizes positioning by the location based service; and
    store an indication of whether the location based service is authorized to position the user.

19. The location privacy proxy of claim 17, wherein the control logic is further configured to:
    determine if the location based service has previously positioned the user;
    if the location based service has not previously positioned the user, access a user profile to determine if the user may be positioned.

20. The location privacy proxy of claim 17, wherein the control logic is further configured to:
    attach the unique ID of the user to a positioning request prior to positioning the user.

* * * * *